United States Patent [19]

Maule

[11] Patent Number: 4,776,181
[45] Date of Patent: Oct. 11, 1988

[54] EVAPORATIVE HEAT EXCHANGER

[75] Inventor: Russell R. Maule, Beacon Hill, Australia

[73] Assignee: Salfon Pty. Ltd., Tunbridge Wells, United Kingdom

[21] Appl. No.: 929,741

[22] PCT Filed: Oct. 4, 1985

[86] PCT No.: PCT/AU85/00243
§ 371 Date: Jul. 17, 1986
§ 102(e) Date: Jul. 17, 1986

[87] PCT Pub. No.: WO86/02151
PCT Pub. Date: Apr. 10, 1986

[30] Foreign Application Priority Data
Oct. 5, 1984 [AU] Australia ............... PG7513

[51] Int. Cl.$^4$ ............................................. F25B 27/00
[52] U.S. Cl. ..................... 62/323.1; 62/376; 126/19.5
[58] Field of Search ............ 62/376, 268, 52, 532, 62/323.1; 203/11; 126/19.5

[56] References Cited

U.S. PATENT DOCUMENTS

| 3,344,041 | 9/1967 | Wulfson | 159/18 |
| 3,344,584 | 10/1967 | Kehoe et al. | 159/DIG. 31 |
| 3,528,890 | 9/1970 | Brown | 55/46 |
| 3,597,164 | 8/1971 | Ab-Der-Halden | 62/532 |
| 3,675,436 | 7/1972 | Ganiaris | 62/52 |
| 3,732,690 | 5/1973 | Meijer | 123/1 A |
| 3,844,132 | 10/1974 | Miller et al. | 62/268 |
| 4,144,849 | 3/1979 | Dahm | 123/41.1 |

Primary Examiner—Ronald C. Capossela
Attorney, Agent, or Firm—Beveridge, DeGrandi & Weilacher

[57] ABSTRACT

Recirculating coolant from an engine passes through tubes in a heat exchanger pressure vessel. A cooling medium is directed onto the exterior surfaces of the tubes, and the pressure within the vessel is reduced to lower the temperature of evaporation of the cooling medium. A thermostatic control reduces or prevents the flow of engine coolant to the tubes when the coolant temperature falls below the temperature of evaporation of the cooling medium.

9 Claims, 3 Drawing Sheets

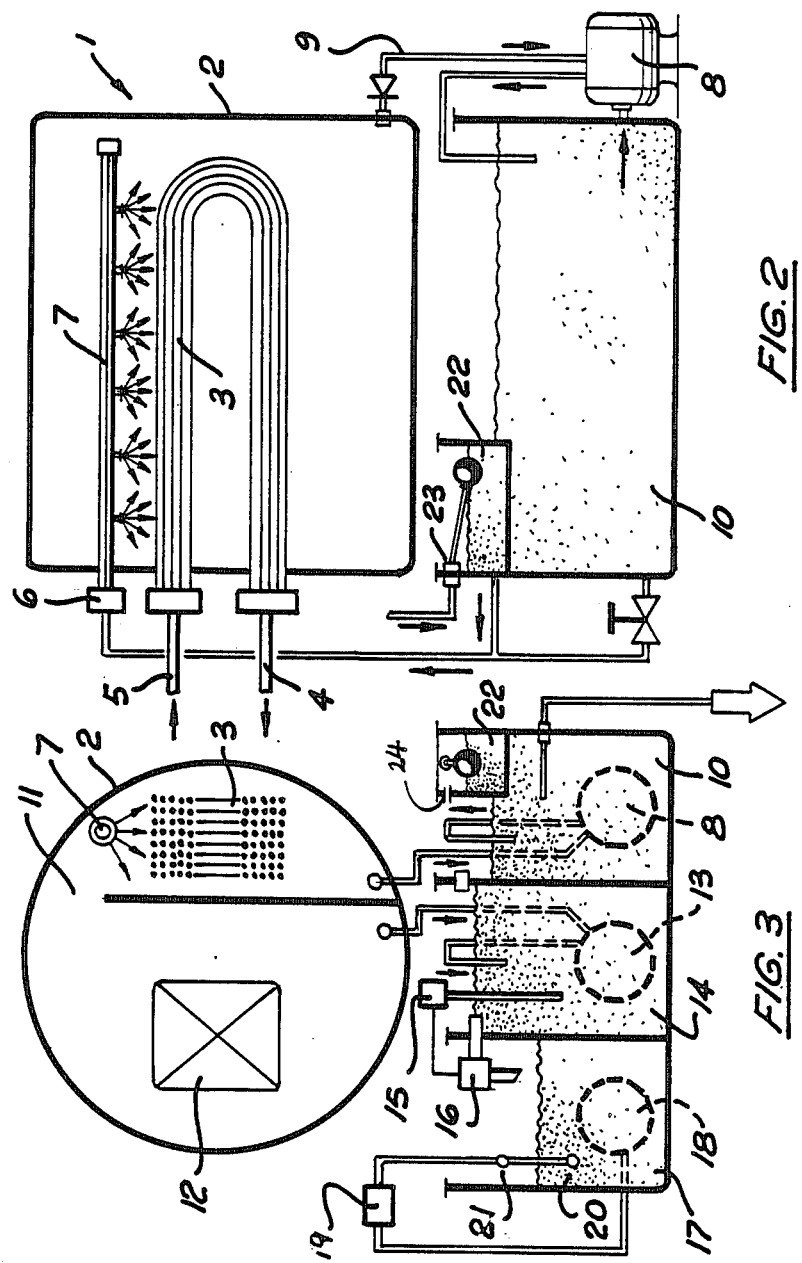

EVAPORATIVE HEAT EXCHANGER

BACKGROUND OF THE INVENTION

1. Field of the Invention

The present invention relates to a method for transferring heat from one liquid to another, to heat exchangers for performing the method, and particularly to such exchangers wherein the coolant is passed through a network of conduction passages across which a cooling medium is passed.

2. Description of the Prior Art

Hitherto, water cooled heat exchangers operating at temperatures below 100° C. at atmospheric pressure and in temperate ambient conditions suffer the shortcoming of poor effiency due to the low heat gradient between the coolant such as flows through an engine and the cooling medium. In the past this problem has been overcome by one of, or a combination of two methods.

In a first method the flow rate of the cooling medium across to the passages is increased. The problems associated with this solution are two-fold. Firstly, increased energy is required to pump the cooling medium across the passages and secondly, a greater amount of cooling medium is required. This can be a particular problem in closed cycle, fluid cooling medium systems.

In a second method the length of passage is increased, increasing the contact area between the coolant and the cooling medium. The problems associated with this method are increased cost of manufacture and increased required coolant pump capacity to overcome the frictional losses incurred in the increased passage length.

It is an object of the present invention to provide a method and apparatus able to avoid or at least ameliorate the above listed shortcomings by utilizing latent heat of vaporization to assist in the cooling process, the boiling point of the cooling medium being reduced below the temperature of the coolant by reducing the pressure of the cooling medium.

SUMMARY OF THE INVENTION

According to the first aspect the invention consists in a method of transferring heat from a first fluid to a second, the temperature of the first being less than the boiling point of the second at ambient pressure, comprising the steps of:

causing the fluids to come into heat flow communication; and, reducing the pressure of the second fluid so that it boils at or below the temperature of the first.

According to a second aspect the invention consists in a heat exchanger for performing the method comprising:

a pressure vessel;

at least one tube for conducting a fluid into, within, and out of the vessel;

means for admitting a cooling medium to the vessel, and directing it over the exterior surface of the tube within the vessel;

means for removing the cooling medium from the vessel after contact with the tube; and means for reducing pressure in the vessel whereby to lower the temperature of evaporation of the cooling medium.

BRIEF DESCRIPTION OF THE DRAWINGS

Preferred embodiments of the apparatus of the present invention will now be described by way of example only, with reference to the accompanying drawings in which:

FIG. 2 is a schematic side elevation of a desalination plant incorporating the heat exchanger of FIG. 1;

FIG. 3 is a schematic end elevation of the plant of FIG. 2; and

DESCRIPTION OF THE PREFERRED EMBODIMENTS

Figure 1:
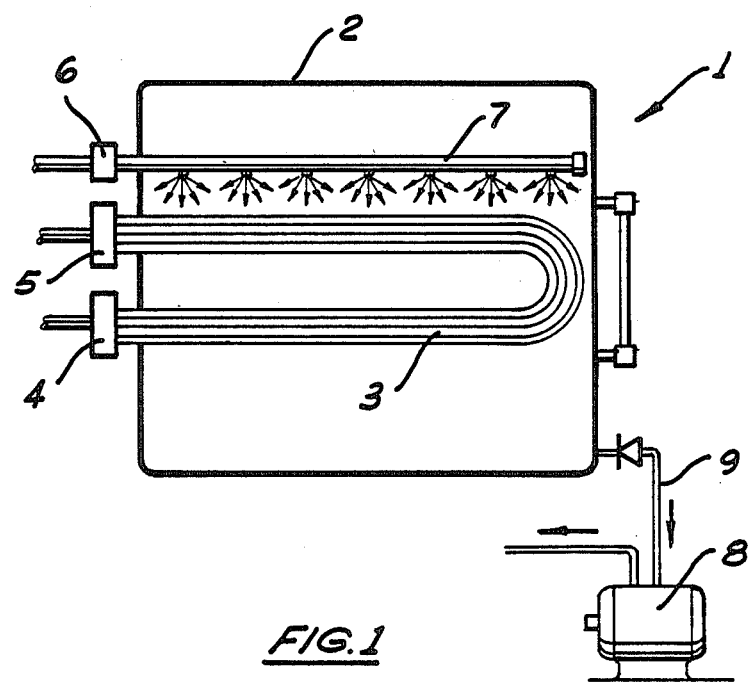
FIG. 1 is a schematic representation of a heat exchanger according to the invention.

Referring first to FIG. 1 a heat exchanger 1 is shown, which was developed to cool the engine cooling water (coolant) from a "Caterpillar 398G" by 5° C. from 85° C. to 80° C.; both of which are below the boiling point of water at sea level atmospheric pressure, with the cooling medium at 20°.

The heat exchanger 1 comprises a pressure vessel 2 and a plurality of tubes 3 housed within the pressure vessel 2.

Coolant inlet ports 4 and coolant outlet ports 5 are provided on the respective ends of tubes 3 and extend into the pressure vessel 2. The tubes 3 are adapted to conduct the coolant from the engine (not shown) through the pressure vessel 2.

The tube 3 may be in the form of pre-fabricated bundles of tubes welded together. They may be constructed from AISI 316 stainless steel for corrosion resistance to high saline or other corrosive cooling mediums. However, the tubes could be constructed from any suitable material such as copper.

A means for admitting a cooling medium to the vessel comprises a cooling medium inlet 6 which is in fluid flow communication with a plurality of spray nozzles 7 whereby the cooling medium may be directed over the exterior surface of the tubes 3 within the pressure vessel 2.

It will be appreciated by those skilled in the art that any means for directing the cooling medium over the tubes 3 such as a slotted duct delivering a continuous curtain of cooling medium to the tubes 3 will fall within the scope of the present invention.

A means for removing the cooling medium from the pressure vessel 2 after it has contacted tubes 3 comprises a vacuum pump 8 which is connected to the pressure vessel 2 for fluid flow communication by line 9.

Whilst line 9 joins the pressure vessel 2 adjacent its lowest point it may join the pressure vessel at any suitable point.

By restricting the flow rate in which the cooling medium is able to pass through the cooling medium inlet 6 relative to the rate at which the vacuum pump 8 is able to extract the cooling medium, the pressure within the pressure vessel 2 is able to be reduced with respect of the ambient pressure.

In this embodiment the means for removing the cooling medium from the vessel and the means for reducing pressure in the vessel are one and the same. However, it is envisaged that this operation may be achieved by utilizing for example, two such devices, one for removing the cooling medium from the vessel, and another for reducing the pressure in the vessel via a separate outlet.

The pressure within the vessel must be maintained at a level whereat the boiling point of the cooling medium is below the temperature of the coolant being passed through the tubes 3. This enables the heat exchanger to rely upon latent heat of vaporization to provide efficient cooling even though the temperature of the coolant is below the boiling point of the cooling medium, at ambient pressure, coming from the engine.

The cooling medium pumped from the pressure vessel 2 by pump 8 may be discarded or it may be passed through a cooling device of one form or another and thence recycled through inlet 6.

In the preferred embodiment the thermostat of the engine controls flow of hot engine cooling water via inlet 4 through tubes 3 and thus the return from outlet 5 to the engine of cooler water, the flow control being such that the heat of rejection of the engine is extracted and the engine is maintained at an optimum operating temperature.

When water is used as the cooling medium and coolant, the pressure in the vessel is lowered so that the cooling medium boils at or below 40° C., which is well below the temperature of the engine coolant being 85° C. entering the tubes 3 during normal operation. Both the coolant and the cooling medium are below the boiling point of water at ambient presure. The latent heat of vapourisation may therefore be utilized to minimize the flow rates required since the cooling medium is caused to boil upon coming into heat flow communication with the coolant. An advantage in this example is that the water temperature may be maintained significantly below that at which scaling occurs from all common impurities found in impure coolants and cooling mediums. Because scaling reduces the efficiency of heat exchanges, such an arrangement enables the exchanger to operate for long periods without appreciable decrease in efficiency.

Referring now to FIGS. 2 and 3 the cooling medium 1 of FIG. 1 is shown modified for use in a desalination plant. The pressure vessel 2 is divided into two sections. The first, an evaporator section, contains the tube 3 and the spray nozzles 7. The cooling medium, in this case salt water, is sprayed over the tubes 3 which under the existing conditions of pressure cause some of the salt water to evaporate, the remainder collecting at the bottom of the evaporator section to be evacuated by pump 8 and from there stored in blow down tank 10.

The salt free vapour generated in the evaporator section is able to pass through a passage 11 at the top of the vessel 2 into the second section where it is condensed by a condensor coil 12. The resultant distilled water is collected in the bottom of the second section from where it is evacuated by a distilled water vacuum pump 13. The distilled water so evacuated is stored in a holding tank 14.

The rate of evacuation by pumps 8 and 13 with respect to the rate inflow through nozzles 7 is such that the pressure in the vessel 2 is maintained at a reduced level.

The distilled water held in the holding tank 14 is saline tested by a saline probe 15. If the water in holding tank 14 is sufficiently desalinated a valve 16 which is responsible to a signal from probe 15 admits water from the holding tank 14 to a distilled water tank 17 from where it is pumped by a pump 18.

The operation of the pump 18 is controlled by a float switch 19 which causes the pump to operate when the level of the distilled water in the distilled water tank 17 is within a predetermined zone bounded by levels 20 and 21.

As distilled water is extracted from pressure vessel 2 the level in the distilled water tank 14 will rise and flow through valve 16 to discharge into tank 17.

The feed water is fed into the evaporator from tank 22 at a greater rate than the distillate produced. The excess concentrate water or "Blow down" is required to keep dissolved solids in solution. The blow down is extracted from the pressure vessel 2 into blow down tank 10 by a pump 8 causing the level in tank 10 to rise and overflow to waste through overflow 24.

Figure 4:
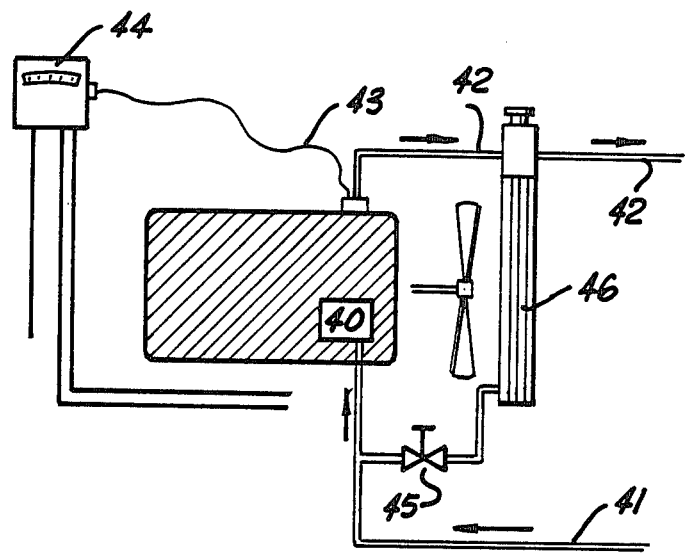
FIG. 4 is a schematic view of a combustion engine constituting a heat source for the plant of FIGS. 2 and 3.

The coolant which flows through tubes 3 is heated as it effects the cooling of an internal combustion engine, in this case a "Caterpillar 398G" engine which is schematically represented in FIG. 4. The engines water pump 40 draws coolant water through the tubes 3 via hose 41. This water is then pumped through the engine to maintain it at its optimum operating temperature and from there via hose 42 back through tubes 3.

Should the water temperature as measured by the engines thermostat 43 fall to a temperature at which, having regard to the reduced pressure in the pressure vessel 2, the cooling medium would not boil, a controller 44 effects the closing of a valve 45. The controller does this by comparing the temperature perceived by the thermostat 43 with a predetermined temperature having regard to the pressure in the pressure vessel and if that temperature is below the predetermined temperature the valve 45 is pneumatically opened.

Once valve 45 is opened coolant is able to flow through a radiator 46. The pressure drop through the radiator is less than that through the tubes and therefore once the valve 45 is opened the preferred passage of the coolant is through the radiator. The radiator is less able to cool the coolant than the heat exchanger 1 and therefore the temperature of the water rises until such time as the controller 44, having received a signal from thermostat 43 indicating that the temperature has risen to above the predetermined temperature, effects the closing of valve 45 to once again cause the coolant to flow through the tubes 3 of the heat exchanger 1.

The salt water entering the pressure vessel via spray nozzle 7 does so at a temperature of approximately 20°. The pressure in the vessel 2 is such that the salt water boils at a temperature between 40° C. and 45° C. The temperature of the coolant entering the tubes from the engine is about 85° C., cooling to about 80° C.

It has been found that a desalination plant which operates at the above temperatures does not suffer from the desposition of salts which is often a problem is higher temperature desalinization plants.

It will be appreciated that any heat exchanger operated at a pressure below ambient to thereby utilize latent heat of vaporization will fall within the scope of the present invention whether or not the cooling medium, and coolant are water.

It will further be appreciated that the coolant need not be a liquid but may be any suitable fluid.

It will also be appreciated that the tubes 3 may be immersed in a bath of cooling medium maintained under reduced pressure and that an apparatus in such a condition will fall within the scope of the invention.

I claim:

1. A system comprising an engine which has an engine coolant inlet and an engine coolant outlet, means for conducting a recirculating coolant from the engine coolant outlet through a heat exchanger to the engine coolant inlet;

said heat exchanger comprising a pressure vessel, at least one tube means for conducting the recirculating coolant into, within, and out of the vessel, and means for admitting a cooling medium to the vessel and directing it over the exterior surface of at least one tube means within the vessel;

means for removing the cooling medium from the vessel after contact with the tube means; means for reducing pressure in the vessel in order to lower the temperature of evaporation of the cooling medium; and a thermostat responsive to temperature of the recirculating coolant at or near the engine coolant outlet to control the flow of recirculating coolant from said engine coolant outlet to said tube means so as to reduce or prevent flow of recirculating coolant through said tube means when said temperature falls below the temperature of evaporation of the cooling medium.

2. A heat exchanger according to claim 1 wherein said means for admitting a cooilng medium comprises a cooling medium inlet port, and a plurality of nozzle means in fluid flow communication with said inlet port for directing cooling medium over said tubes.

3. A heat exchanger according to claim 2 wherein said means for removing the cooling medium is a pump means.

4. A heat exchanger according to claim 2 wherein said pump means is operable at a capacity which overcomes any vacuum loss caused by the inflow of the cooling medium through said nozzles.

5. A heat exchanger according to claim 4 wherein the cooling medium and said fluid are water and wherein the cooling medium enters the vessel at about 20° C. the fluid enters the at least one tube means at about 80° C. and the pressure in the vessel is such that the cooling medium boils at approximately 40° C.

6. A system according to claim 1 wherein the vessel is divided into an evaporator section including said nozzles and said at least one said tube means and a condensation section communicating with the evaporator section in an upper portin of the vessel, the condensation section including a condensor coil, and means for removing liquid from the condensation section.

7. Apparatus according to claim 6 comprising means for pumping saline water as the cooling medium and means for recovering salt free water from the condensation section.

8. Apparatus according to claim 7 wherein the engine includes a radiator which is connected in parallel with the tube means, and means for causing the coolant to flow through the radiator when the temperature of the coolant falls below a predetermined temperature.

9. A method of operating a system which includes an engine which has an engine coolant inlet and an engine coolant outlet, a thermostat, and a heat exchanger which has at least one tube extending into, within and out of a pressure vessel, said method including the following steps:

conducting a recirculating coolant from the engine coolant outlet through the heat exchanger to the engine coolant inlet; conducting the recirculating coolant through said tube of the heat exchanger, admitting a cooling medium to the vessel and directing it over the exterior surface of at least one tube within the vessel; removing the cooling medium from the vessel after contact with the tube; reducing pressure in the vessel to lower the temperature of evaporation of the cooling medium, operating said thermostat in response to temperature of the recirculating coolant at or near the engine coolant outlet to control the flow of recirculating coolant from said engine coolant outlet to said tube to reduce or prevent the flow of recirculating coolant through said tube when said temperature falls below the temperature of evaporation of the cooling medium.

* * * * *